United States Patent
Baumgartner et al.

(10) Patent No.: US 7,904,741 B2
(45) Date of Patent: *Mar. 8, 2011

(54) DYNAMIC CLOCK PHASE ALIGNMENT BETWEEN INDEPENDENT CLOCK DOMAINS

(75) Inventors: Steven John Baumgartner, Zumbro Falls, MN (US); Charles Porter Geer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 646 days.

This patent is subject to a terminal disclaimer.

(21) Appl. No.: 11/870,985

(22) Filed: Oct. 11, 2007

(65) Prior Publication Data

US 2008/0072093 A1    Mar. 20, 2008

Related U.S. Application Data

(63) Continuation-in-part of application No. 11/533,065, filed on Sep. 19, 2006.

(51) Int. Cl.
G06F 1/00 (2006.01)
G06F 1/24 (2006.01)
G06F 1/12 (2006.01)
(52) U.S. Cl. ............ 713/500; 713/503; 713/400
(58) Field of Classification Search ........ 713/400
See application file for complete search history.

(56) References Cited

U.S. PATENT DOCUMENTS

| | | | |
|---|---|---|---|
| 5,485,490 A | 1/1996 | Leung et al. | |
| 5,554,945 A | 9/1996 | Lee et al. | |
| 5,757,857 A | 5/1998 | Buchwald | |
| 5,945,862 A | 8/1999 | Donnelly et al. | |
| 6,002,279 A | 12/1999 | Evans et al. | |
| 6,122,336 A | 9/2000 | Anderson | |
| 6,182,237 B1 | 1/2001 | Bronson et al. | |
| 6,329,859 B1 | 12/2001 | Wu | |
| 6,509,773 B2 | 1/2003 | Buchwald et al. | |
| 6,744,285 B2 * | 6/2004 | Mangum et al. | 326/96 |
| 6,791,388 B2 | 9/2004 | Buchwald et al. | |
| 7,012,983 B2 | 3/2006 | Buchwald et al. | |
| 7,123,674 B2 | 10/2006 | Mackey et al. | |
| 7,155,651 B2 * | 12/2006 | Nadeau-Dostie et al. | 714/731 |
| 7,263,149 B2 | 8/2007 | Ware et al. | |
| 7,379,520 B2 | 5/2008 | Chen | |
| 2002/0039395 A1 | 4/2002 | Buchwald et al. | |
| 2002/0044618 A1 | 4/2002 | Buchwald et al. | |
| 2002/0194173 A1 | 12/2002 | Bjornson et al. | |
| 2003/0002596 A1 | 1/2003 | Dunning et al. | |
| 2003/0037048 A1 | 2/2003 | Kabra et al. | |
| 2004/0212416 A1 | 10/2004 | Buchwald et al. | |
| 2007/0053283 A1 | 3/2007 | Bidwell et al. | |
| 2007/0058735 A1 | 3/2007 | Ghosh | |

* cited by examiner

*Primary Examiner* — Suresh K Suryawanshi
(74) *Attorney, Agent, or Firm* — Martin & Associates, LLC; Bret J. Petersen (57) ABSTRACT

A design structure is described for dynamically aligning clocks in independent clock domains with minimal latency. In the preferred embodiments, a reference clock in the destination clock domain that is some multiple times the data clock of the destination clock domain is used to sample a data sample signal from the source domain. The sampled data is used to determine at what time slice of the reference clock the data sample signal is changing and therefore at what phase of time slice or phase of the data clock the clocks can be aligned to ensure valid data will be transferred between clock domains.

20 Claims, 5 Drawing Sheets

| XOR vector <0:3> | Transition Quadrant | Clksel<0:1> with Clk_adjust<0:1> = 00 | Clksel<0:1> with Clk_adjust<0:1> = 01 | Clksel<0:1> with Clk_adjust<0:1> = 10 | Clksel<0:1> with Clk_adjust<0:1> = 11 |
|---|---|---|---|---|---|
| 1000 | Q1 | 01 | 11 | 00 | 10 |
| 0100 | Q2 | 11 | 00 | 10 | 01 |
| 0010 | Q3 | 00 | 10 | 01 | 11 |
| 0001 | Q4 | 10 | 01 | 11 | 00 |
| 0000 | None | 10 | 01 | 11 | 00 |
| 1001 | Q1 & Q4 | 10 | 01 | 11 | 00 |

DYNAMIC CLOCK PHASE ALIGNMENT BETWEEN INDEPENDENT CLOCK DOMAINS

CROSS-REFERENCE TO RELATED APPLICATION

This application is a Continuation-In-Part (CIP) of U.S. Ser. No. 11/533,065 of the same title filed on Sep. 19, 2006, which is incorporated herein by reference.

BACKGROUND OF THE INVENTION

1. Technical Field

This invention generally relates to clock signals in electronic systems and more specifically relates to a design structure for dynamic clock phase alignment between independent clock domains.

2. Background Art

Most computer and other electronic systems use synchronized logic to analyze, store and transmit data. Synchronized logic systems have one or more clock signals that are used to keep the logic synchronized. The "clocks" or clock signals are used to latch data or activate logic components. The clock signals are most often an oscillating square wave signal, or at least close to a square wave. The activation of logic components by the clock signal is most often done on the rising or falling edge of the clock signal.

In many computer and electronic systems there are high speed data links and other links that pass signals from one clock domain to another. Each of the clock domains are synchronized by different clock distribution networks where each of the clock distribution networks is typically a set of related clocks. The phase relationship of the clocks in the separate domains is sometimes unknown due to spatial separation of the clock domains or because different logic families are used to generate the clock networks. Another possible reasons for phase difference is the amount of logic in the clock path from the oscillator that increases the clocks sensitivity to voltage and temperature differences.

In some prior art systems with asynchronous clocks, data is aligned to clock boundaries using multiple latches that insure the data is latched properly across the asynchronous boundary. Other prior art systems use handshaking signals or FIFOs (first-in-first-out buffers) to synchronize data between clock domains. These common prior art solutions introduce a significant delay in the data stream. Without a way to more efficiently align clock signals in dependent clock domains, the computer industry will continue to suffer from clock latency and inefficient alignment of the clocks of independent clock domains.

BRIEF SUMMARY OF THE INVENTION

A design structure is described for dynamically aligning clocks in independent clock domains with minimal latency. In the preferred embodiments, a clock on the destination side of the clock domains to be aligned that is some multiple times the source clock is used to sample a data sample signal from the source domain. The sampled data is then used to determine at what time slice or phase of the faster clock the data is changing and therefore at what time slice the clocks can be aligned to ensure valid data will be transferred between clock domains.

While the preferred embodiments described herein are directed to a reference clock that is 2 times the data clock, the claimed embodiments herein expressly include other clock multiples. For example, a reference clock that is 4 times the source clock would require 9 bits of sampled data to give 8 possible time domains to align the clocks. The smaller granularity requires a faster clock but with more samples the clocks can be aligned with a finer granularity to reduce latency between clock domains even more. Other non-integer clock multiples could also be use.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and.

DETAILED DESCRIPTION OF THE INVENTION

A design structure of an electronic system is described for dynamically aligning clocks in independent clock domains with minimal latency.

Figure 1:
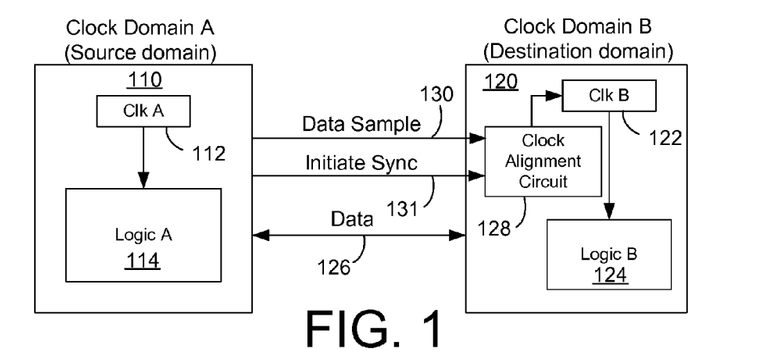
FIG. 1 is a block diagram of a system in accordance with preferred embodiments of the present invention.

FIG. 1 illustrates a block diagram of an electronic system with multiple clock domains and a clock alignment circuit to align the clocks of the second domain with the first domain according to preferred embodiments herein. Clock domain A 110 represents a portion of an electronic system that operates with a first clock, clk A 112. Clk A 112 provides a data clock to logic A 114. Logic A 114 represents the circuits in clock domain A 110 that operate with a clock or set of clocks represented by clk A. Similarly, clock domain B 120 represents a second portion of an electronic system that operates with a second clock, clk B 122, that provides a data clock to circuit B 124. Clock domain A sends and receives data and/or control signals 126 to clock domain B 120. Clock domain A can therefore be considered the source domain since it sources the data sample signal 130 to synchronize the clock in the destination domain, or clock domain B 120.

It is desirable to align the clocks between clock domain A 110 and clock domain B 120 so that the data and control signals 126 between the systems will be interpreted correctly. A clock alignment circuit 128 uses a data sample signal 130 from the clock A (source) domain to select a phase of the clk B 122 to use in the clock B (destination) domain 120 to dynamically align the clocks of the two clock domains according to embodiments described and claimed herein. Further, the clock alignment circuit receives an initiate sync signal 131 from the source clock domain to indicate when to initiate a synchronization of the clocks between the source clock domain and the destination clock domain. The sync signal 131 may need to be buffered and synchronized with the state machine (described further below) in the destination clock domain.

Figure 2:
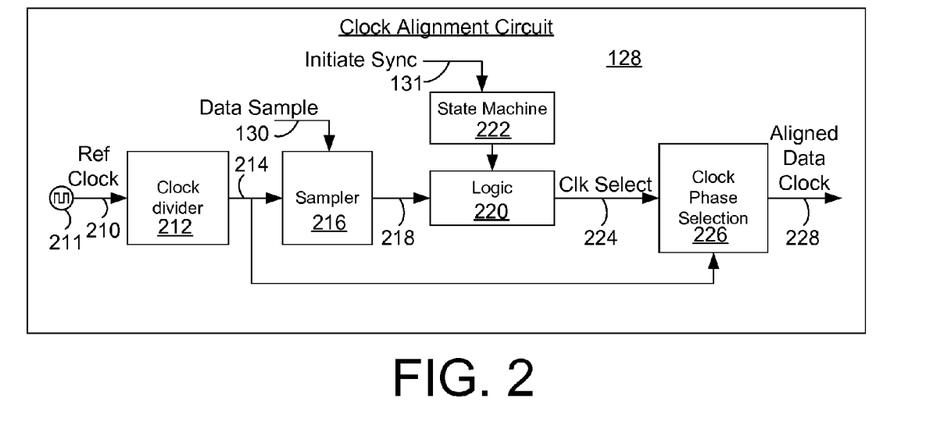
FIG. 2 is a schematic diagram of a clock alignment circuit in accordance with preferred embodiments of the present invention.

FIG. 2 illustrates a block diagram that shows additional detail of the clock alignment circuit 128 introduced above with reference to FIG. 1. In preferred embodiments herein, the clock alignment circuit 128 inputs a reference clock 210. Thereference clock signal is a typical square wave generated with an oscillator circuit 211 as know in the prior art. The reference clock signal 210 is applied to a clock divider circuit 212 to create multiple capture clocks 214. In a preferred embodiment, the reference clock is divided in two to create 4 capture clocks 214 that are equally displaced by 90 degrees. The capture clocks 214 are described further below. Other multiples of the reference clock could also be used. Each of the capture clocks 214 is used to latch the data sample 130 from the other clock domain by a sampler circuit 216. The sampler circuit supplies the latched sampled data to a logic circuit 220 that is controlled by a state machine 222. The state machine 222 controls the logic circuit 220 to determine which of the capture clocks is best centered on the data sample signal 130. The logic circuit 220 outputs a clock select 224 to the clock phase selection circuit 226 to select and output an aligned clock 228 to be used in the destination clock domain. Further details of each of the logic blocks of the clock alignment circuit 128 will be described further below.

Figure 3:
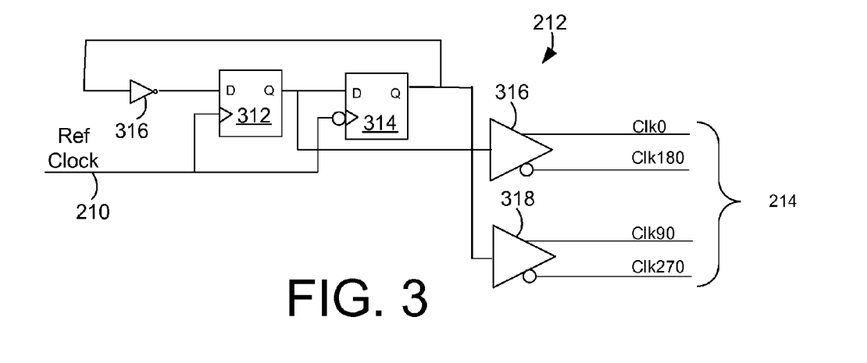
FIG. 3 is a schematic diagram of a clock divider circuit in accordance with preferred embodiments of the present invention.

FIG. 3 shows a circuit diagram of the clock divider circuit 212 introduced above with reference to FIG. 2. The clock divider circuit divides an incoming reference clock signal 210 in half and generates four phases of clock signals with half the frequency of the input clock signal. In the illustrated embodiment of the clock divider circuit 212, the reference clock signal 210 is connected to the clock input of a first flip-flop 312 and to the inverting clock input of a second flip-flop 314 (in the alternative, an inverted reference clock could be used in a non-inverting clock input). The output of the first flip-flop 312 is connected to the D-input of the second flip-flop. The output of the second flip-flop is connected to the D-input of the first flip-flop 312 through an inverter 316. The two flip-flops connected as shown in FIG. 3 provide a dividing of the reference clock as is commonly known in the prior art. The outputs of the first flip-flop 312 is also connected to the inputs of an inverting differential driver 316 that provides a first phase clock output designated as clk0 and an inverted version of the first phase designated as clk180 since it is 180 degrees out of phase with the first clock output. Similarly, the outputs of the second flip-flop 314 is also connected to the inputs of an inverting differential driver 318 that provides a second phase clock output designated as clk90 and an inverted version of the second phase designated as clk270.

Figure 4:
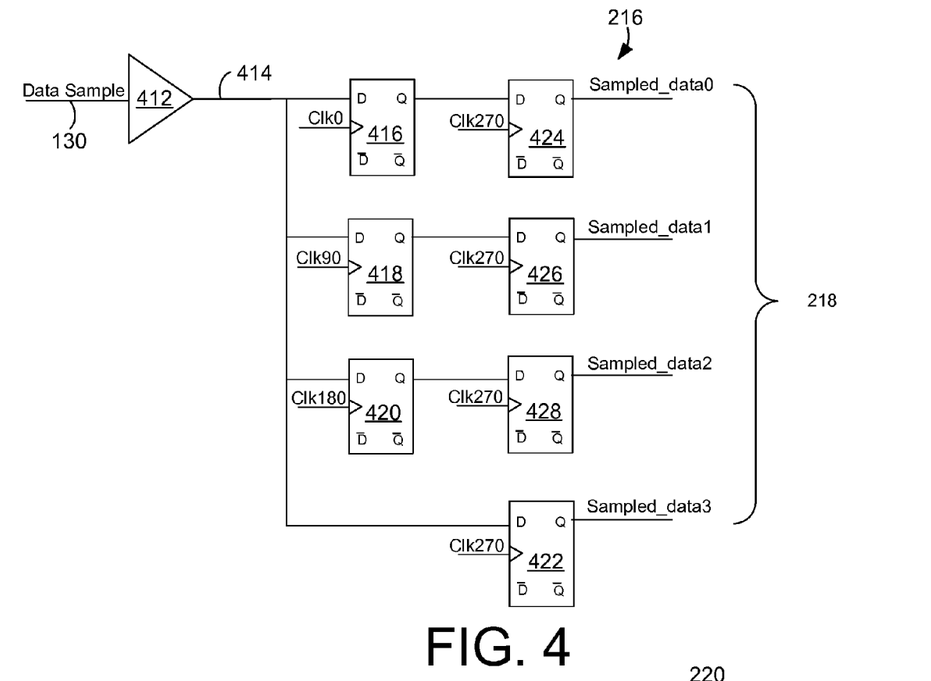
FIG. 4 is a schematic diagram of a data sampling circuit in accordance with preferred embodiments of the present invention.

FIG. 4 shows a circuit diagram of the data sampler circuit 216 introduced above with reference to FIG. 2. In the data sampler circuit 216, the capture clocks 214 produced by the clock divider circuit 212 are used to latch the data sample signal 130 from the other clock domain. The data sampler circuit then supplies the latched data samples to a logic circuit 220. In the illustrated embodiment of FIG. 4, the data sampler circuit 216 inputs the data sample 130 from the other clock domain into the inputs of a buffer 412. The buffered data sample signal 414 is applied to the D inputs of four D flip-flops 416, 418, 420, 422. The four flip-flops 416, 418, 420, 422 are clocked by clk0, clk90, clk180 and clk270 respectively. The outputs of the first three flip-flops 416, 418, 420 are connected to a second set of flip-flops 424, 426, 428 that are all clocked by clk270. The second set of flip-flops ensures that the latched data samples are all available at the same time (clk270) and not changing when examined by the logic circuit 220. The outputs of the second set of flip-flops along with the last of the first set of flip-flops 422 supply the latched data sample signal as sampled_data0 through sampled_data3 218 to the logic circuit 220 described further below.

Figure 5:
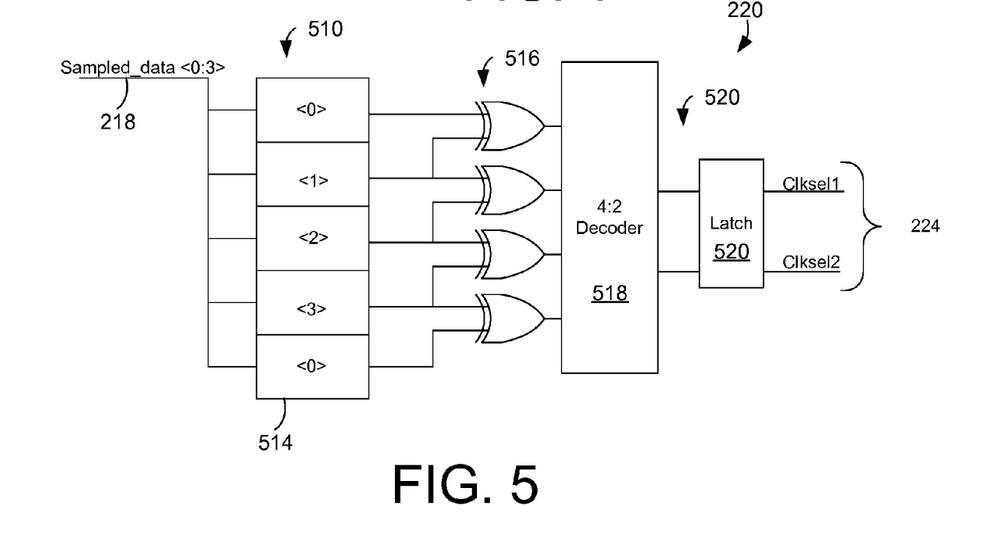
FIG. 5 is a schematic diagram of a clock decoding circuit in accordance with preferred embodiments of the present invention.

FIG. 5 shows a circuit diagram of the logic circuit 220 introduced above with reference to FIG. 2. The logic circuit 220 inputs the sampled data 218 from the data sampler circuit 216 and determines which phase of the clock the data sample transitions. The timing and function of this circuit are described further with reference to the timing diagram illustrated in FIG. 7. The logic circuit 220 includes a bank of latches 510 that latches the sampled data 218. The first four latches in the bank of latches 510 latch the first set of sampled data 218. A second latch for sampled_data0 latches the next sampled_data0 that occurs sequentially in time after the sampled data in the first four data latches. The clocks of the data latches 510 are controlled by the state machine to latch the data as described herein. The state machine 222 is not shown in further detail. However it would be clear to those skilled in the art that any state machine or digital processor could be used to control the circuits as described herein using prior art state machine techniques.

Again referring to FIG. 5, the bank of latches 510 provide the sampled data outputs 218 to a set of exclusive-OR gates 516. The sampled data outputs 218 of adjacent bits are connected to the exclusive-OR gates 516. Sampled_data0 and sampled_data1 are connected to the first exclusive-OR gate and so forth. The outputs of the exclusive-OR gates 516 are connected to a decoder 518. The decoder 518 determines which phase of the clock the data sample input transitioned on by the logical position of the exclusive-OR gate that has an asserted output. The decoder 518 outputs a two bit clock selection that represents the phase of the clock where the data sample was observed to transition. The decoder 518 output is latched in a latch 520 by the state machine 222 and is held there until the next cycle to update the clock phase alignment. The latch 520 clock selection outputs are clksel1 and clksel2 224. Clksel1 and clksel2 represent a clock select vector that is used by the clock selection circuit 226 to select the clock phase to be used in the destination clock domain (Clock domain B 120) to best align the source clock domain with the source clock domain (Clock Domain A 110).

Figure 6:
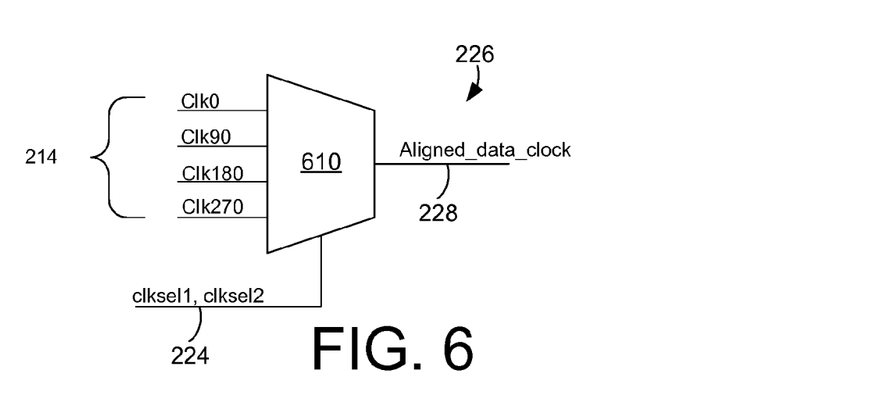
FIG. 6 is a schematic diagram of a clock selection circuit in accordance with preferred embodiments of the present invention.

FIG. 6 shows a circuit diagram of the clock phase selection circuit 226 introduced above with reference to FIG. 2. The clock phase selection circuit 226 is a four-to-one analog multiplexor 610 that selects one of the four phases of the clock divider circuit 212 to use for the aligned clock 228 of the source clock domain (clock domain B 120). The clock phase selection circuit 226 uses the clock selection outputs clksel1 and clksel2 224 from the logic circuit 220 as inputs to the four-to-one multiplexor 610.

Figure 7:
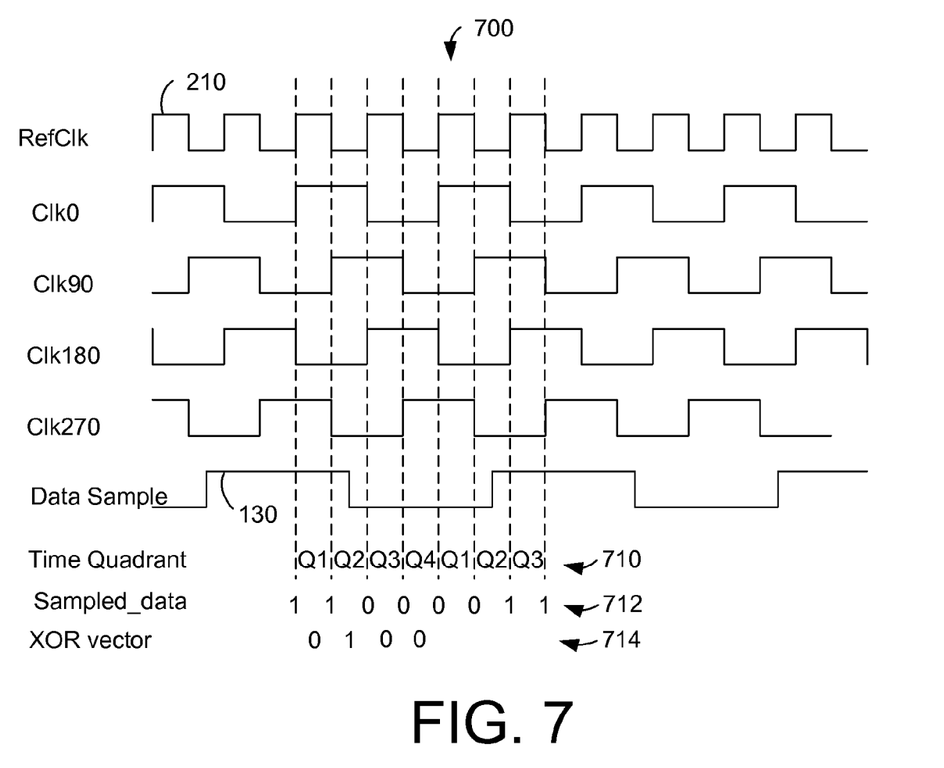
FIG. 7 is a timing diagram that shows the operation of the circuits in accordance with preferred embodiments of the present invention.

FIG. 7 shows a timing diagram 700 for the clock alignment circuit 128 as described above with reference to FIGS. 2 through 6. The top signal of the timing diagram 700 is the reference clock 210 that is used to generate the four phases of the clock (clk0, clk90, clk180, clk270) that are also shown in phase with the reference clock 210. The reference clock is divided in four quadrants that correspond to the four clock phases. The time quadrants 710 are illustrated with dashed lines and labeled as Q1, Q2, Q3 and Q4 710. The data sample 130 in the timing diagram is the same data sample that is output from the source clock domain 110. The data sample 130 is not synchronized with the clocks of the destination domain 120. In preferred embodiments, the clock alignment circuit (128 FIG. 2) aligns the clock of the destination domain to the clock of the source domain using the data sample 130. The clock alignment circuit 128 selects the clock phase which will provide the proper setup and hold margins needed to reliably capture the data sent between the two clock domains as described further below.

Again referring to FIG. 7, the clock alignment circuit (128 FIG. 2) aligns the clock of the destination domain with the source domain by selecting a phase of the reference clock to use for the clock of the destination domain. The clock alignment circuit uses each phase of the clocks (clk0, clk90, clk180, clk270) to sample the data sample 130 as described above with reference to FIG. 4. The sampled_data line 712 of the timing diagram represents the sampled data from data sample 130. The sampled_data 712 is the logical value of the data sample 130 input at the beginning of the respective time quadrant 710. The sampled_data is stored in the bank of latches discussed above (510 of FIG. 5). Adjacent bits in the sampled_data bits are Exclusive-ORd as described above with reference to FIG. 5.

The XOR line 714 of the timing diagram represents this Exclusive OR result of adjacent sampled_data. Where there is a logical "1" in the XOR line 714, it indicates that there was a change in the value of the data sample 130 in the respective time quadrant. In preferred embodiments, the clock alignment circuit aligns the clock of the source domain with the clock of the destination domain by determining the time domain where the change in the data sample 130 occurred and then selecting a phase of the reference clock which will best provide the proper setup and hold margins needed to reliably capture the data sent between the two clock domains.

In the illustrated example of FIG. 7, the time domain where the data sample changes is in quadrant Q2. The decoder (518 of FIG. 5) is programmed with an appropriate XOR vector to select a clock phase that will reliably capture data sent between the clock domains. In this case, a likely choice would be to choose a clock that would latch incoming data to the destination clock domain in quadrant Q4. Quadrant Q4 is chosen by programming the decoder to select the clock corresponding to Q4 with the XOR vector input of 0100. In this example, the decoder would be programmed to have the value of "11" to select quadrant Q4 with the XOR vector input of 0100.

Again referring to FIG. 7, the XOR line 714 has four logical bits of data that represent the XOR of the five bits of the sampled value 712. These four bits of the XOR line also correspond to the output of the bank of XOR gates 516 described above with reference to FIG. 5. In the ideal case, there would be a single logical "1" bit in the four bits of the XOR line corresponding to values 1000, 0100, 0010, and 0001. However, due to a meta stable event caused by the data sample signal 130 switching right when the clock goes active, or by asymmetry of the data sample signal 130, the XOR vector could be 1001 (multiple switching) or 0000 (no switching). In one case there is a switch at the beginning and end of the cycle and in the other there is no switch detected. All other cases are invalid as since there cannot be multiple switches in the middle of a cycle. In these last two cases the vector is right on the edge of 1000 and 0001. In this case it is arbitrary which vector is selected between 1000 and 0001. In preferred embodiments, the decoder 518 is programmed to interpret these two capture errors and output 0001 to select an appropriate clock phase.

Figure 8:
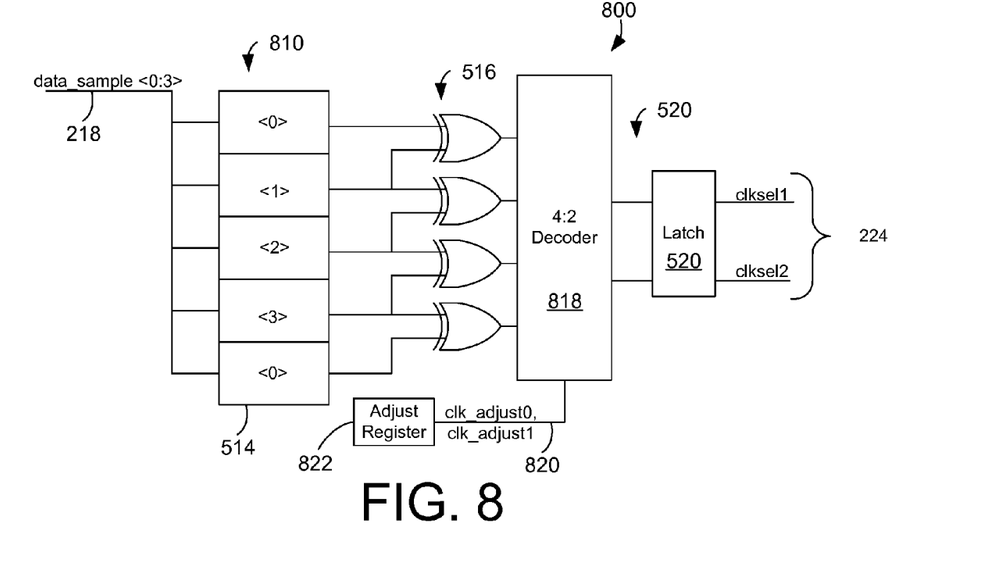
FIG. 8 is a schematic diagram of a logic circuit in accordance with preferred embodiments of the present invention.

FIG. 8 shows a logic circuit 800 similar to the logic circuit described in FIG. 5 according to another embodiment. In this embodiment, the decoder 818 includes clock adjust inputs clk_ajust0 and clk_adjust1 820. The clock adjust inputs 820 allow the timing of the clock adjustments to be configurable depending on other factors. For example, if the hardware is skewed one way or the other making the default case not in the middle, the clock adjust inputs can be set to modify the clock selects. In a preferred embodiment, the clock adjust bits come from an adjust register 822 which can be loaded by the system. The adjust register 822 can also be initially loaded during POR (power on reset) from fuses which are set during manufacturing. This gives the ability to initially set the timing based on test measurements of individual assembly parameters.

Figure 9:
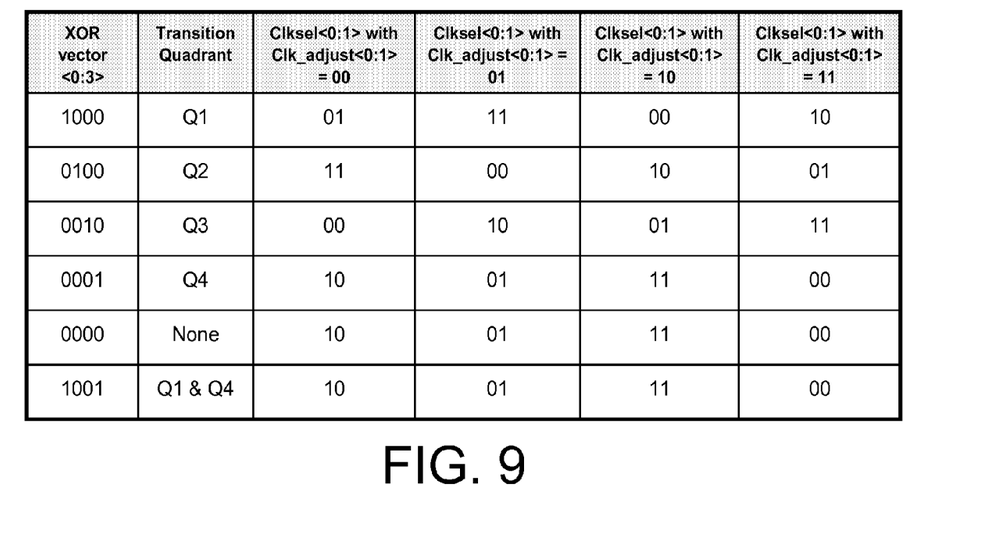
FIG. 9 is a table that shows the logic of the decoder in the logic circuit in accordance with preferred embodiments of the present invention.

FIG. 9 represents the operation of the decoder 818 with the different clock adjust inputs. This table represents one possible programming of the decoder 818 to adjust the clock selection depending on the clock adjust inputs. The left-hand column lists the possible XOR vector's from the bank of exclusive-OR gates 516. The second column lists the corresponding time quadrants for reference. The other columns show the decoder 818 output depending on the clock adjust settings. For example, the third column represents clock select outputs (clock select vector) of the decoder for clock adjust inputs of "00", which is the same as the decoder would be if it didn't have a clock adjust input as described above with reference to FIG. 5. The other three columns show the decoder output for the clock adjust inputs of 01, 10 and 11 respectively.

As mentioned above, embodiments herein can dynamically adjust the clock phase alignment between independent clock domains. The process described above can be initiated to adjust the clock phase in a variety of ways. Logic in the destination clock domain or the source clock domain (using the initiate sync signal 131) can be used to initiate the clock alignment to adjust the clock phase and change the clock select vector, Alternatively, the current clock select vector can be maintained, and the process can be activated to determine whether the timing in the system has changed and whether there is another clock vector that would be more aligned, but without changing the clock vector. Thus the above system allows for automatic system control of the clock generation or in conjunction with manual input from a computer operator through appropriate software control of the state machine.

Figure 10:
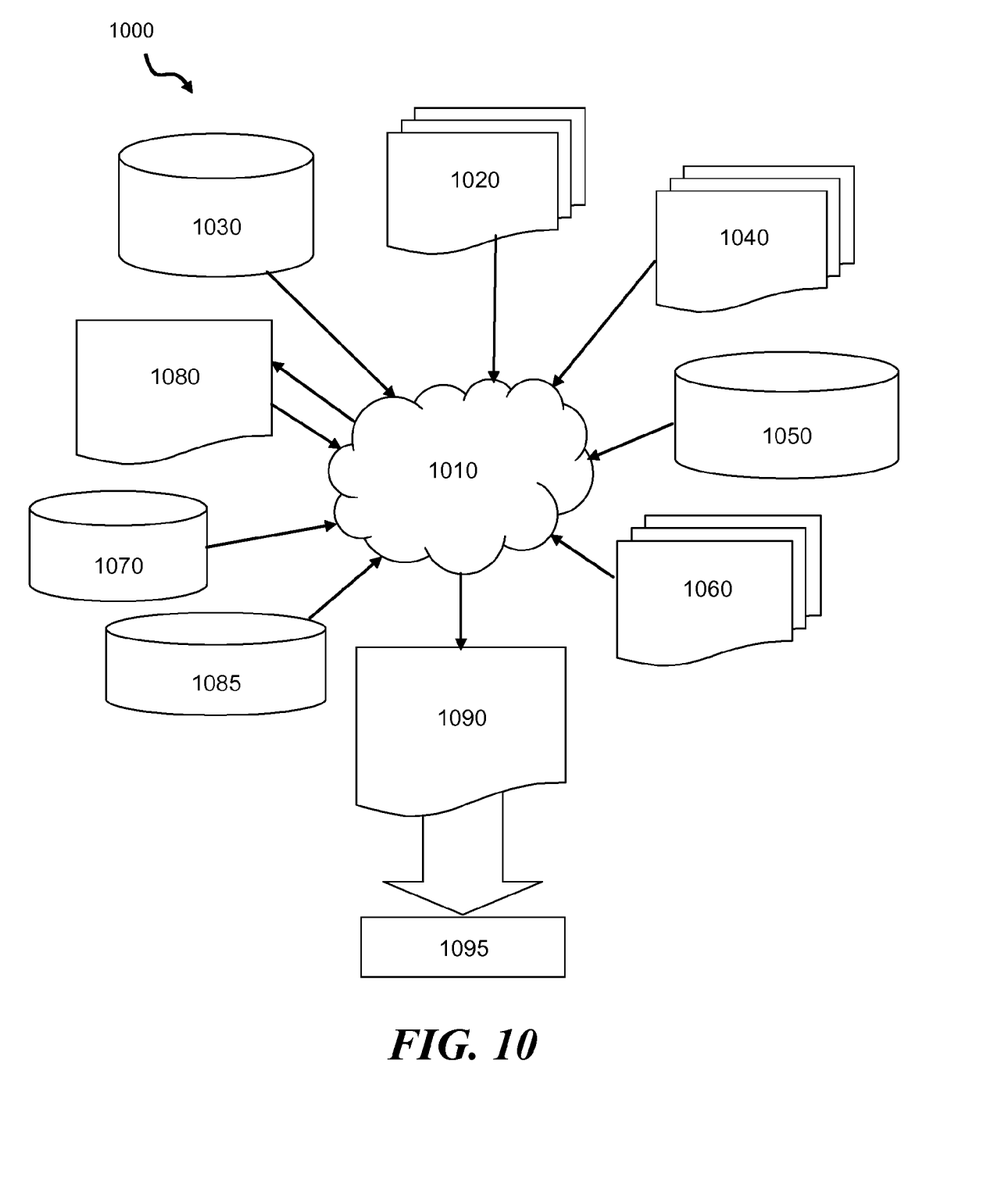
FIG. 10 is a flow diagram of a design process used in semiconductor design, manufacturing, and/or test.

FIG. 10 shows a block diagram of an example design flow 1000. Design flow 1000 may vary depending on the type of IC being designed. For example, a design flow 1000 for building an application specific IC (ASIC) may differ from a design flow 1000 for designing a standard component. Design structure 1020 is preferably an input to a design process 1010 and may come from an IP provider, a core developer, or other design company or may be generated by the operator of the design flow, or from other sources. Design structure 1020 comprises circuit 128 in the form of schematics or HDL, a hardware-description language (e.g., Verilog, VHDL, C, etc.). Design structure 1020 may be contained on one or more machine readable medium. For example, design structure 1020 may be a text file or a graphical representation of circuit 128. Design process 1010 preferably synthesizes (or translates) circuit 128 into a netlist 1080, where netlist 1080 is, for example, a list of wires, transistors, logic gates, control circuits, I/O, models, etc. that describes the connections to other elements and circuits in an integrated circuit design and recorded on at least one of machine readable medium. This may be an iterative process in which netlist 1080 is resynthesized one or more times depending on design specifications and parameters for the circuit.

Design process 1010 may include using a variety of inputs; for example, inputs from library elements 1030 which may house a set of commonly used elements, circuits, and devices, including models, layouts, and symbolic representations, for a given manufacturing technology (e.g., different technology nodes, 32 nm, 45 nm, 90 nm, etc.), design specifications 1040, characterization data 1050, verification data 1060, design rules 1070, and test data files 1085 (which may include test patterns and other testing information). Design process 1010 may further include, for example, standard circuit design processes such as timing analysis, verification, design rule checking, place and route operations, etc. One of ordinary skill in the art of integrated circuit design can appreciate the extent of possible electronic design automation tools and applications used in design process 1010 without deviating from the scope and spirit of the invention. The design structure of the invention is not limited to any specific design flow.

Design process 1010 preferably translates an electronic apparatus for aligning clocks between independent clock domains as shown in FIGS. 1 through 9, along with any additional integrated circuit design or data (if applicable), into a second design structure 1090. Design structure 1090 resides on a storage medium in a data format used for the exchange of layout data of integrated circuits (e.g. information stored in a GDSII (GDS2), GL1, OASIS, or any other suitable format for storing such design structures). Design structure 1090 may comprise information such as, for example, test data files, design content files, manufacturing data, layout parameters, wires, levels of metal, vias, shapes, data for routing through the manufacturing line, and any other data required by a semiconductor manufacturer to produce an electronic apparatus for aligning clocks between independent clock domains as shown in FIGS. 1 through 9. Design structure 1090 may then proceed to a stage 1095 where, for example, design structure 1090: proceeds to tape-out, is released to manufacturing, is released to a mask house, is sent to another design house, is sent back to the customer, etc.

Other embodiments include different physical locations of the various components of the system described herein. For example, various functions of the clock alignment circuit may reside in clock domain A as well as in clock domain B. Thus the clock alignment may be accomplished by selecting different phases of a clock in clock domain A according to sampled data and a logic circuit located in clock domain B.

An apparatus, method and design structure has been described for dynamically aligning clocks in independent clock domains with minimal latency. The preferred embodiments provide a clock alignment circuit that uses the data sample signal to determine which phase of the reference clock to use to align the data clock of the destination clock domain with the data clock of the source clock domain.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A design structure embodied in a non-transitory machine readable medium used in a design process, the design structure comprising an electronic apparatus for aligning clocks between independent clock domains comprising:
    a reference clock in a destination clock domain that has a frequency that is a multiple of a data clock in the destination clock domain such that the reference clock defines multiple phases to use for the data clock in the destination clock domain;
    a data sample signal connected to the destination clock domain that changes with a data clock in the source clock domain; and
    a clock alignment circuit that uses the data sample signal to determine which phase of the reference clock to use to align the data clock of the destination clock domain with the data clock of the source clock domain.

2. The design structure of claim 1 wherein the clock alignment circuit comprises:
    a clock divider circuit that provides the multiple clock phases from the reference clock;
    a data sampler circuit that latches the data sample signal with the multiple clock phases to produce sampled data for each phase of the reference clock;
    a logic circuit that determines which of phase of the multiple clock phases that can be used to reliably capture data send from the source clock domain; and
    a clock selector circuit that selects a phase of the reference clock to use to in the destination clock domain using the clock select vector.

3. The design structure of claim 2 wherein the logic circuit comprises:
    a plurality of latches that hold sequential samples of the data sample signal latched by the multiple phases for the destination clock;
    a plurality of exclusive-OR gates connected to exclusive-OR adjacent bits in the plurality of latches; and
    a decoder that outputs a clock select code based on an output from the plurality of exclusive-OR gates.

4. The design structure of claim 3 wherein the multiple phases for the destination clock selected from the reference clock includes four phases and the plurality of latches hold five sequential samples of the data sample signal latched by four phases for the data clock.

5. The design structure of claim 4 wherein the five sequential samples are applied to four exclusive-OR gates that are connected to the decoder to output a two bit clock select code that selects one of the four clock phases for the data clock of the source clock domain.

6. The design structure of claim 3 wherein the multiple phases for the destination clock selected from the reference clock includes eight phases and the plurality of latches hold nine sequential samples of the data sample signal latched by eight phases for the data clock.

7. The design structure of claim 3 wherein the decoder of the logic circuit further comprises a clock adjust input to select a different clock select code for a given output from the plurality of exclusive-OR gates depending on a logic value applied to the clock adjust input.

8. The design structure of claim 7 wherein the logic value applied to the clock adjust input is obtained from an adjust register that is pre-loaded based on lab test measurements of individual assembly parameters.

9. The design structure of claim 1 wherein the clock divider circuit that provides four clock phases from the reference clock that has a frequency that is twice the frequency of the data clock of the source clock domain.

10. The design structure of claim 1 wherein the clock divider circuit initiates an alignment of the clock of the source domain and destination clock domains due to manual input from a computer operator through software control of a state machine in the logic circuit.

11. The design structure of claim 1, wherein the design structure comprises a netlist, which describes the circuit.

12. The design structure of claim 1, wherein the design structure resides on storage medium as a data format used for the exchange of layout data of integrated circuits.

13. The design structure of claim 1, wherein the design structure includes at least one of test data files, characterization data, verification data, or design specifications.

14. A design structure embodied in a non-transitory machine readable medium used in a design process, the design structure comprising an electronic apparatus for aligning clocks between independent clock domains comprising:
   a reference clock in a destination clock domain that has a frequency that is a multiple of a clock frequency of a data clock in a source clock domain such that the reference clock defines multiple phases to use for a data clock in the destination clock domain;
   a data sample signal connected to the destination clock domain that changes with the data clock in the source clock domain; and
   a clock alignment circuit that uses the data sample signal to determine which phase of the reference clock to use to align the data clock of the destination clock domain with the data clock of the source clock domain by latching the data sample signal with each phase of the data clock and exclusive-ORing the adjacent latched data sample signal to determine which phase of the reference clock the data clock in the source clock domain is changing.

15. The design structure of claim 14 wherein the clock alignment circuit comprises:
   a clock divider circuit that provides the multiple clock phases from the reference clock;
   a data sampler circuit that latches the data sample signal with the multiple clock phases to produce data samples for each phase of the reference clock;
   a logic circuit that determines which of phase of the multiple clock phases that contains the transition of the data sample signal to create a clock select vector; and
   a clock selector circuit that selects a phase of the reference clock to use to align the data clock of the destination clock domain with the data clock of the source clock domain using the clock select vector.

16. The design structure of claim 15 wherein the logic circuit comprises:
   a plurality of latches that hold sequential samples of the data sample signal latched by the multiple phases for the data clock;
   a plurality of exclusive-OR gates connected to exclusive-OR adjacent bits in the plurality of latches; and
   a decoder that outputs a clock select code based on an output from the plurality of exclusive-OR gates.

17. The design structure of claim 16 wherein the multiple phases for the data clock from the reference clock includes four phases and the plurality of latches hold five sequential samples of the data sample signal latched by four phases for the data clock.

18. The design structure of claim 14, wherein the design structure comprises a netlist, which describes the circuit.

19. The design structure of claim 14, wherein the design structure resides on storage medium as a data format used for the exchange of layout data of integrated circuits.

20. The design structure of claim 14, wherein the design structure includes at least one of test data files, characterization data, verification data, or design specifications.

* * * * *